(12) United States Patent
Wyckoff et al.

(10) Patent No.: US 9,882,272 B2
(45) Date of Patent: Jan. 30, 2018

(54) VEHICLE ANTENNA CONTROL SYSTEM AND METHOD

(71) Applicant: Deere & Company, Moline, IL (US)

(72) Inventors: Jan M. Wyckoff, Sycamore, IL (US); David L. Reuter, Port Byron, IL (US); Manuel Camacho, Davenport, IA (US); Jeremiah J. Johnson, Hampton, IL (US); Vickie L. Ellis, Milan, IL (US); Brian J. Gilmore, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/053,287

(22) Filed: Feb. 25, 2016

(65) Prior Publication Data
US 2017/0250463 A1    Aug. 31, 2017

(51) Int. Cl.
*H01Q 1/12* (2006.01)
*H01Q 1/32* (2006.01)
*H01Q 3/06* (2006.01)
*H04W 4/02* (2009.01)

(52) U.S. Cl.
CPC ............. *H01Q 1/32* (2013.01); *H01Q 3/06* (2013.01); *H04W 4/021* (2013.01)

(58) Field of Classification Search
CPC .......... H01Q 1/1235; H01Q 1/32; H01Q 9/30
USPC ....... 343/704, 711, 712, 713, 715, 882, 883, 343/900, 901
See application file for complete search history.

(56) References Cited

U.S. PATENT DOCUMENTS

| | | | | |
|---|---|---|---|---|
| 2,329,200 A | * | 9/1943 | Hefele | H01Q 1/084 343/750 |
| 2,367,164 A | * | 1/1945 | Yerger, Jr. | H01Q 1/084 244/130 |
| 3,873,985 A | * | 3/1975 | Altmayer | H01Q 1/08 343/714 |
| 5,164,739 A | * | 11/1992 | Koide | H01Q 5/40 343/715 |
| 6,906,684 B2 | | 6/2005 | Turner | |
| 7,561,102 B2 | * | 7/2009 | Duvall | G01S 5/0027 340/426.19 |

* cited by examiner

*Primary Examiner* — Tho G Phan

(57) ABSTRACT

A control system and method is provided for raising and lowering a vehicle antenna. The control system includes a location receiver for generating vehicle location data, an obstacle detection unit which generates an obstacle signal, an antenna, an antenna motor for raising and lowering the antenna and a control unit. The control unit controls the antenna motor as a function of the vehicle location data and the obstacle signal. The control unit compares the vehicle location signal to stored or received geofencing information defining a geofenced area, and causes the antenna motor to raise the antenna when the vehicle location corresponding to the vehicle location data is inside the geofenced area and no obstacle is detected. The control unit causes the antenna motor to lower the antenna when the vehicle location corresponding to the vehicle location data is outside the geofenced area or if an obstacle is detected.

9 Claims, 2 Drawing Sheets

VEHICLE ANTENNA CONTROL SYSTEM AND METHOD

TECHNICAL FIELD

The present disclosure relates to a vehicle antenna control system and method (e.g., for raising and lowering a vehicle antenna).

BACKGROUND

An antenna mast may be mounted on a vehicle. The antenna may be used for reception, transmission or both reception and transmission of electromagnetic signals. During vehicle movement or transportation, the maximum antenna height has been limited to a lower transport height to avoid bending, breaking or damage to the antenna from trees, bridges or other obstructions. The limitation in height of the antenna may limit the maximum range of effective communications between the vehicle and a communications device located remotely apart from the vehicle. For example, electromagnetic radiation that is in the microwave frequency range may be limited to propagation in line-of-sight paths or may be severely attenuated by ground clutter where antenna height is insufficient for a requisite level of clearance in accordance with applicable electromagnetic propagation models. For example, the grain bin of a combine may interfere with radio frequency (RF) signal transmission and reception of an antenna at the lower transport height. Accordingly, a need exists for maximizing antenna height of an antenna mounted on a vehicle when the vehicle is within a defined or geofenced area in order to improve the range and reliability of communications and to increase the accuracy of vehicle guidance within that area.

SUMMARY

According to an aspect of the present disclosure, a control system raises and lowers a vehicle antenna. The control system includes a location-determining receiver for generating a vehicle location data (e.g., two or three-dimensional coordinates), an obstacle detection unit for generating an obstacle signal when an obstacle is detected, an antenna motor for raising and lowering the antenna, and a control unit. The control unit receives the vehicle location signal and the obstacle signal. The control unit compares the vehicle location data to stored or received geofencing information defining a geofenced area. The control unit causes the antenna motor to raise the antenna when the vehicle location indicated by the location data is inside the geofenced area and no obstacle is detected. The control unit causes the antenna motor to lower the antenna when the vehicle location indicated by the location data is outside the geofenced area or if an obstacle is detected.

DETAILED DESCRIPTION OF THE DRAWINGS

Figure 1:
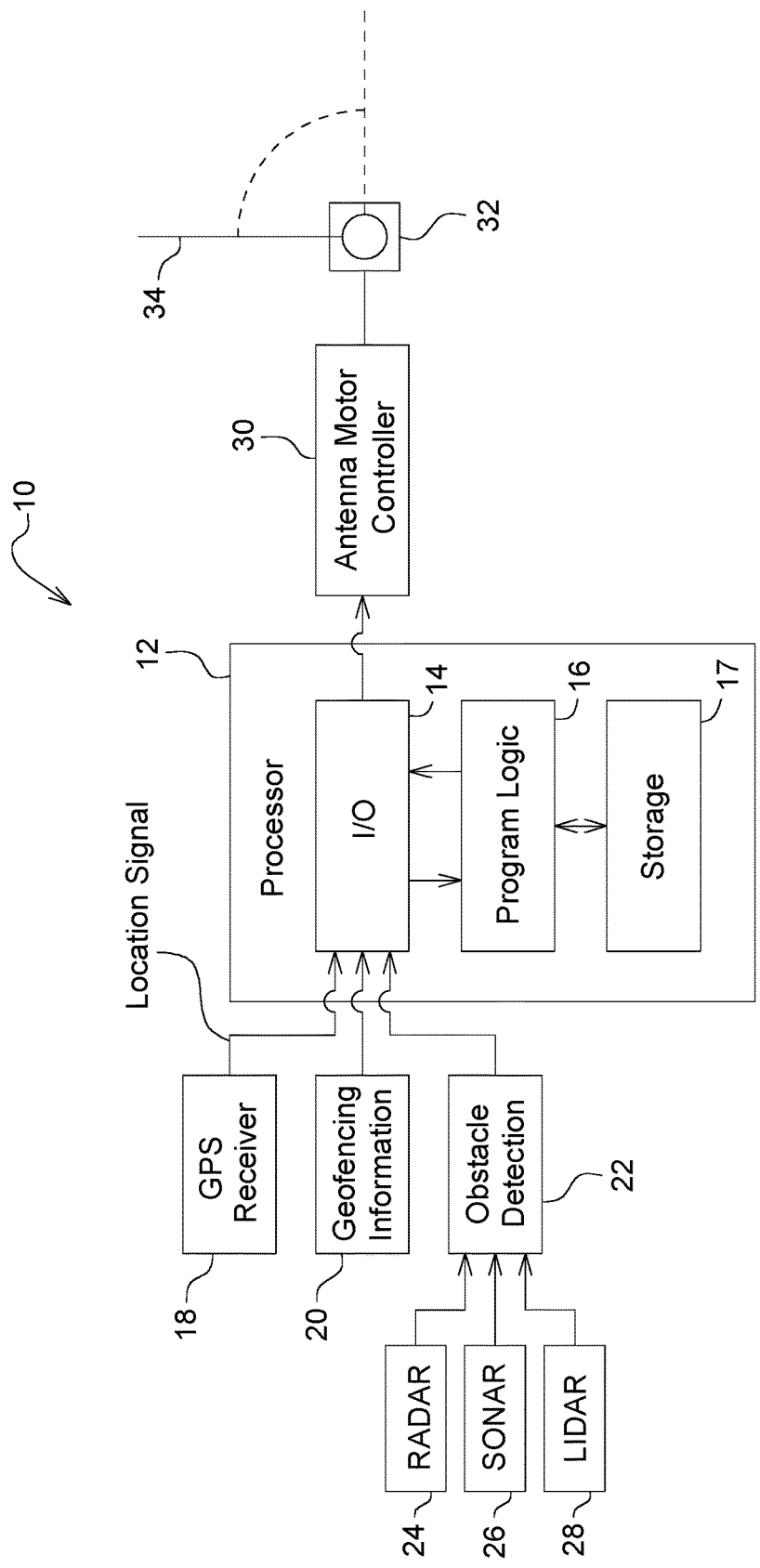
FIG. 1 is a schematic diagram of an antenna control system embodying the invention.

Referring to FIG. 1, the antenna control system 10 is designed for use on a vehicle (not shown). The antenna control system includes a processor or electronic control unit (ECU) 12 which includes and input/output (I/O) unit 14, a program logic unit 16 and a data storage unit 17. The I/O unit 14 receives a location signal for a location-determining receiver or receiver 18, such as a conventional location-determining receiver (e.g. Global Positioning Receiver, or more generally GNSS (Global Navigation Satellite System).

The I/O unit 14 also receives geofencing information from a geofencing unit 20. A geofence defines a boundary or perimeter of a geographic area, such as by geographic coordinate points that lie on the boundary or perimeter, or straight or curved line segments that interconnect points. The geofence can be stored as a file, a look-up table, a database or another data record. The georeferencing information (e.g. area boundaries) will be stored in the data storage unit 17, such as nonvolatile memory, a magnetic storage device, or optical storage device. For example, the georeferencing information can be stored by the vehicle traversing the boundary or by importation of a file that has boundaries of an area that is geofenced.

The receiver 18 can traverse the boundary or perimeter of the area to define the geofence, or the geofence can be automatically generated to match political boundaries (e.g., state or county lines, or country borders) or a geometric shape (e.g., circle, ellipse, rectangle) that covers a desired area (e.g., farm, work area, city, or county, or zone). The vehicle (not shown) can then be operated with the location-determining receiver 18 and a stored geofence in data storage unit 17. The processer 12 will regularly determine whether the vehicle location, as determined by location data of the receiver 18, is within the geofenced zone or outside of it.

The I/O unit 14 also receives obstacle detection signals from an obstacle detection unit 22. Obstacle detection unit 22 receives signals from one or more obstacle detectors, such as a radar unit 24, a sonar unit 26 and/or a (Light Detection and Ranging) LIDAR unit 28.

An output of the I/O unit 14 communicates a control output signal to antenna motor controller 30 or antenna actuator. Antenna motor controller 30 comprises an antenna raise/lower unit 32, which operates to raise and lower antenna 34. The antenna 34 could be rotated approximately 90 degrees (e.g., plus or minus 15 degrees) to raise or lower it, or it could be a telescopic design that extends and retracts to increase and decrease its height. In one embodiment, the antenna 34 comprises a telescopic antenna that has a set of telescoping, interlocking and slidably movable substantially cylindrical portions that are aligned to extend or retract vertically about an axis. In one configuration, the antenna raise/lower unit 32 may comprise a gear box (e.g., screw member) to convert rotational movement to linear vertical movement in an upward or downward direction.

Figure 2:
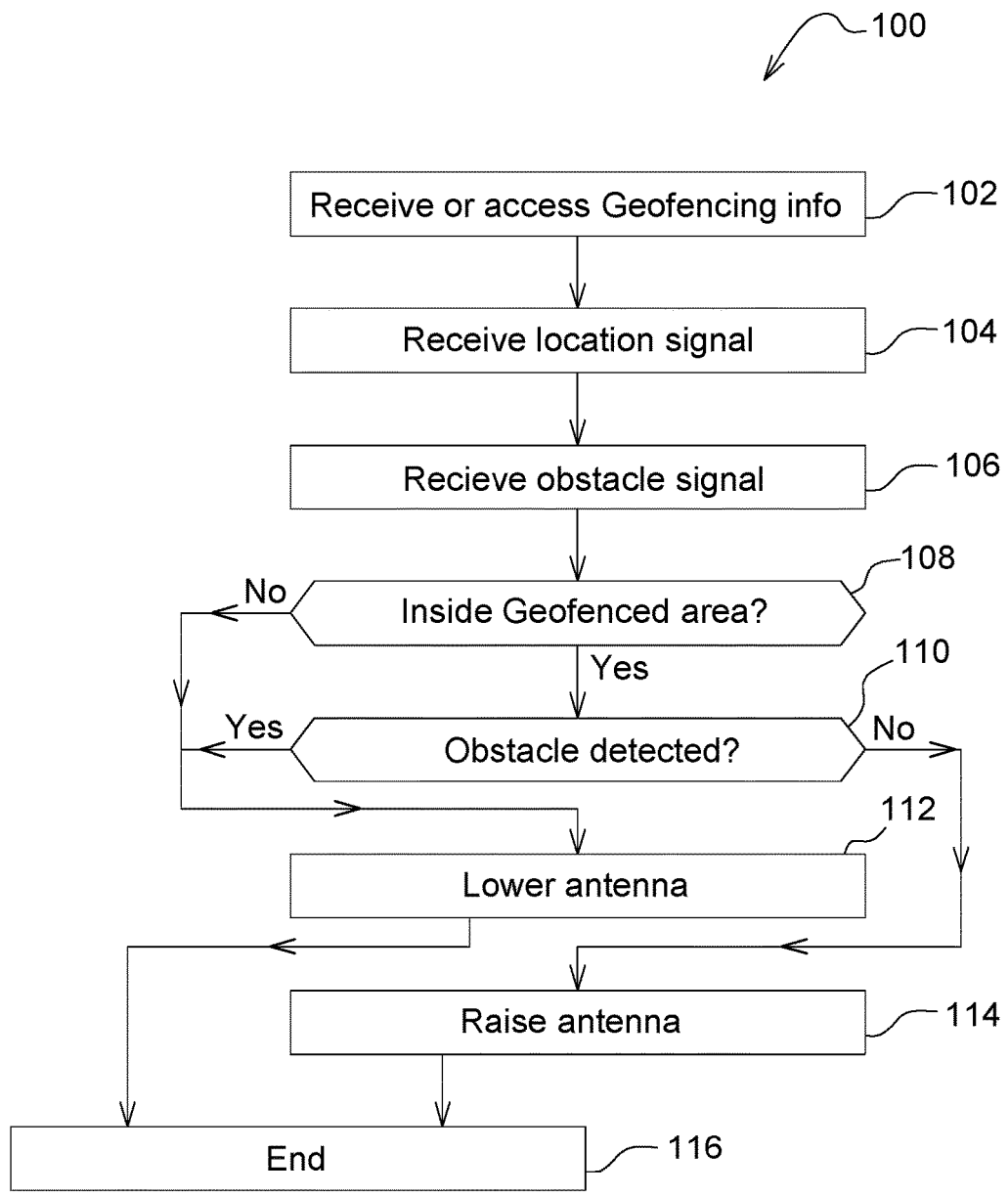
FIG. 2 is a flow chart of an algorithm performed by control system of FIG. 1.

In one embodiment, the ECU 12 periodically executes an algorithm 100 represented by FIG. 2. The conversion of the above flow chart into a standard language for implementing the algorithm described by the flow chart in a digital computer or microprocessor, will be evident to one with ordinary skill in the art.

In step 102 the ECU 12 receives or accesses geofencing information from the geofencing unit 20 or from the data storage unit 17.

In step 104 the ECU 12 receives a location data, which corresponds to the current vehicle location (e.g., two or three dimensional coordinates), from the GPS receiver 18.

In step 106 the ECU 12 receives an obstacle detection signal from the obstacle detection unit 22.

In step 108 the ECU 12, using the location signal and the geofencing information, determines if the system is inside the geofenced area. If yes or the current vehicle location is inside the geofenced area, the algorithm proceeds to step 110, if not to step 112.

Step 110 directs the algorithm to step 112 if an obstacle is detected at the current vehicle location, else to step 114.

Step 112 causes the motor controller 30 to lower the antenna 34.

Step 114 causes the motor controller 30 to raise the antenna 34.

The algorithm ends at step 116.

Thus, with this system the processor 12 will regularly determine whether the vehicle is within the geofenced zone or outside of it, and whether an obstacle has been detected. The system will raise the antenna 34 if the system is inside the geofenced area and no obstacle is detected. Otherwise, the system will lower the antenna 34. This system allows for higher antenna heights on vehicles and includes an automated motorized antenna mount or other actuator to reduce antenna height when the vehicle is not in a geofenced area, such as when the vehicle is in a mobile or transport mode, thus allowing greater clearance for antenna. When the vehicle enters a geofenced area the control system will automatically raise the antenna for optimum RF propagation and distance.

With this system, when the vehicle leaves the road with the antenna folded down and enters a field that is geofenced, the antenna will automatically fold up to a height that will allow optimal RF propagation. When the vehicle leaves the geofenced area and is back on the road the antenna automatically folds down for increased clearence required for transport mode.

While the above describes example embodiments of the present disclosure, these descriptions should not be viewed in a limiting sense. Rather, there are several variations and modifications which may be made without departing from the scope of the present invention as defined in the appended claims.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A control system for raising and lowering a vehicle antenna, the control system comprising:
   a location-determining receiver for generating a vehicle location data;
   an antenna;
   an antenna motor for raising and lowering the antenna;
   a control unit which receives the vehicle location data, the control unit comparing the vehicle location data to stored or received geofencing information defining a geofenced area, the control unit causing the antenna motor to raise the antenna when the vehicle location indicated by the vehicle location data is inside the geofenced area, and the control unit causing the antenna motor to lower the antenna when the vehicle location indicated by the vehicle location data is outside the geofenced area.

2. The control system of claim 1, further comprising:
   an obstacle detection unit for generating an obstacle signal when an obstacle is detected, the control unit causing the antenna motor to lower the antenna when an obstacle is detected.

3. The control system of claim 2, wherein:
   the control unit causing the antenna motor to lower the antenna when the vehicle location indicated by the vehicle location data is outside the geofenced area or if an obstacle is detected.

4. The control system of claim 2, wherein:
   the control unit causing the antenna motor to raise the antenna when the vehicle location indicated by the vehicle location data is inside the geofenced area and no obstacle is detected.

5. The control system of claim 1, wherein:
   the antenna motor pivots the antenna.

6. A control system for raising and lowering a vehicle antenna, the control system comprising:
   a location receiver for generating a vehicle location signal;
   an obstacle detection unit for generating an obstacle signal when an obstacle is detected;
   an antenna;
   an antenna motor for raising and lowering the antenna;
   a control unit which receives the vehicle location signal and which receives the obstacle signal, the control unit comparing the vehicle location signal to stored or received geofencing information defining a geofenced area, the control unit causing the antenna motor to raise the antenna when the vehicle location indicated by a vehicle location data is inside the geofenced area and no obstacle is detected, and the control unit causing the antenna motor to lower the antenna when the vehicle location indicated by the location data is outside the geofenced area or if an obstacle is detected.

7. A method for raising and lowering a vehicle antenna, the method comprising:
   receiving vehicle location data;
   comparing the vehicle location data to stored or received geofencing information defining a geofenced area;
   raising the antenna when the vehicle location data indicates that the vehicle is inside the geofenced area; and
   lowering the antenna when the vehicle location data indicates that the vehicle is outside the geofenced area.

8. The method of claim 7, further comprising:
   generating an obstacle signal when an obstacle is detected;
   raising the antenna when the vehicle location data indicates that the vehicle is inside the geofenced area and no obstacle is detected; and
   lowering the antenna when the vehicle location data indicates that the vehicle is outside the geofenced area or if an obstacle is detected.

9. The method of claim 7 wherein the geofenced information defining a geofenced area comprises a data record containing a boundary of geographic area.

* * * * *